United States Patent [19]
Levin

[11] Patent Number: 5,318,253
[45] Date of Patent: * Jun. 7, 1994

[54] METHOD FOR REMOVING DEPOSITS FROM SURFACES OF THIN-WALLED STRUCTURES AND A DEVICE FOR EFFECTING SAME

[76] Inventor: Igor A. Levin, Petrozavodskaya ulitsa, 15, korpus 1, kv. 113, Moscow, U.S.S.R.

[*] Notice: The portion of the term of this patent subsequent to May 7, 2010 has been disclaimed.

[21] Appl. No.: 623,890
[22] PCT Filed: Mar. 13, 1990
[86] PCT No.: PCT/SU90/00069
§ 371 Date: Dec. 20, 1990
§ 102(e) Date: Dec. 20, 1990
[87] PCT Pub. No.: WO90/11931
PCT Pub. Date: Oct. 18, 1990

[30] Foreign Application Priority Data
Apr. 13, 1989 [SU] U.S.S.R. .................... 4671256

[51] Int. Cl.⁵ .............................. B64D 15/16
[52] U.S. Cl. .................... 244/134 R; 244/134 D
[58] Field of Search .......... 244/134 R, 134 A, 134 D

[56] References Cited

U.S. PATENT DOCUMENTS

| | | | |
|---|---|---|---|
| 3,549,964 | 12/1970 | Levin et al. | 244/134 A |
| 3,809,341 | 5/1974 | Levin et al. | 244/134 R |
| 4,629,149 | 12/1986 | Carson et al. | 244/134 R |
| 4,678,144 | 7/1987 | Goehner et al. | 244/134 R |
| 4,982,121 | 1/1991 | Lardiere, Jr. et al. | 244/134 R |

FOREIGN PATENT DOCUMENTS 0067506 12/1982 European Pat. Off. .
8907492 8/1989 U.S.S.R. .

*Primary Examiner*—Joseph F. Peters, Jr.
*Assistant Examiner*—Carla Mattix

[57] ABSTRACT

In a thin-walled structure being cleaned, there are generated converging waves of elastic deformation by virtue of synchronous excitation of single equal pulses along the contour of the surface being cleaned in the points opposite to one another. To effect this method use is made of an electromagnetic source (1) of mechanical pulses in combination with a waveguide (2) transmitting mechanical pulses to the structure (4) being cleaned and representing a ring (8) with a disk (9) designed to accommodate the source (1) and connected to this ring by jumpers (10).

11 Claims, 5 Drawing Sheets

METHOD FOR REMOVING DEPOSITS FROM SURFACES OF THIN-WALLED STRUCTURES AND A DEVICE FOR EFFECTING SAME

TECHNICAL FIELD

The present invention relates to a method for removing deposits from the surfaces of thin-walled structures, and a device for effecting same.

PRIOR ART

The device that myself and other authors disclosed earlier for deicing thin-walled structures provides for the presence of means for generating electromagnetic field pulses and means for their installation immediately adjacent to the walls being deiced there along so that these pulses are applied to the wall and act upon it, giving rise to elastic deformations of the wall (U.S. Pat. No. 3,549,964). Thus, the point sources essentially created diverging waves of elastic deformation excited with the aid of consecutive single electromagnetic, hydraulic or pneumatic pulses.

In the device, a deflection deformation wave spreads from the point source with a drastic decline in the intensity of the effect as the distance from the source grows. Given linear cylindrical waves, the diverging wave intensity declines proportionate to the distance from a source. With nonlinear waves the intensity drops still faster as the distance from the source grows. As a result, at a distance of a mere 50 mm from the source the intensity drops by one half, therefore, it is necessary that the power of point sources be markedly increased which, in turn, may bring about hazardous residual strains in the skin. On the other hand, it is undesirable that the number of sources be increased either due to a growing weight and mechanical tension of the structural elements.

SUMMARY OF THE INVENTION

The invention is based on the discovery of a method of exciting elastic deformation which makes it possible to distribute intensity of elastic deformation uniformly and to provide a device for effecting same.

In compliance with the invention, in the method for removing deposits from the surfaces of thin-walled structures, comprising provision of elastic deformations in said walls by exciting consecutive single mechanical pulses, according to the invention, equal single pulses are excited synchronously in the opposite points along the contour encompassing the surface section being cleaned, with the result that the converging coherent waves of elastic deformation directed inwards the contour interact with one another at the section being cleaned.

This method provides for practically uniform intensity of deformation waves in the central part of the section being cleaned and a decline in intensity at the edge of the section by merely three times compared to the central part of the section, by contrast, when using the prior art method there occurs a 10-fold decline of intensity at the edge. The method of invention provides for uniform cleaning of the section surface.

It is expedient that single pulses be excited in the points arranged in a closed contour and synchronously with the said pulses single identical pulses should be generated in the center of this contour so that the occurring diverging waves of elastic deformation interact with the converging waves and are coherent therewith. This permits additional intensification of mechanical effect to be provided across the entire area of the section being cleaned, particularly along the edges thereof.

This method for removing deposits can be accomplished by using a device, comprising an electromagnetic source of mechanical pulses transmitted to said walls to generate elastic deformations therein, which, according to the invention, is furnished with a waveguide of mechanical forces of the source having opposite parts limiting the section being cleaned, arranged symmetrically to each other and communicating with the common source of mechanical pulses for synchronous excitation of single pulses in the opposite parts, with the result that the converging coherent waves of elastic deformation arise in the walls being cleaned.

The device of the invention is simple in design, convenient in assembly and service.

The waveguide of this device can be made in the form of a ring, a disk articulated with an electromagnetic source and connected to the ring by way of symmetrically arranged jumpers is accommodated in the center of one of the end planes of the ring. It is expedient that a point source of mechanical pulses should be arranged in the ring center to provide more uniform distribution of energy across the section being cleaned.

To clean elongated surfaces provision should be made for a waveguide made as a pair of parallel arms, some ends of which communicate with the disk, articulated with the source of mechanical pulses, while the other ends are interconnected, or in another variant the waveguide is made in the form of two pairs of arms diverging in opposite directions from the disk articulated with the source of mechanical pulses and interconnected in each pair.

According to one of the exemplary embodiments of the invention, the waveguide is formed by three sectors uniformly disposed lengthwise of an imaginary circumference, which are connected by jumpers, with a centrally arranged disk articulated with the source of mechanical pulses.

The waveguide disk can be made from a nonmagnetic material and an electromagnetic source of mechanical pulses in this case is made up of an inductor and a plate of a conducting material accommodated between the inductor and the disk, and in another variant the waveguide disk is made from a magnetoconducting material and in this case the electromagnetic source of mechanical pulses is formed by the inductor and the disk per se, in so doing, in both cases the inductor is connected to an electric discharge means.

One of the variants provides for the embodiments of the waveguide in the form of an elliptic ring of a conducting material and the source of mechanical pulses is made up of this ring and an elliptic inductor.

BRIEF DESCRIPTION OF THE DRAWINGS

The invention will become more apparent from the description of specific exemplary embodiments thereof, yet not limiting the present invention, reference being made to accompanying drawings, wherein.

BEST MODE OF CARRYING OUT THE INVENTION

First, let un consider one of the exemplary embodiments of the device for removing deposits from the surface being cleaned and the principle of operation, from which the essence of the disclosed method will be easy to understand.

Figures 1, 2:
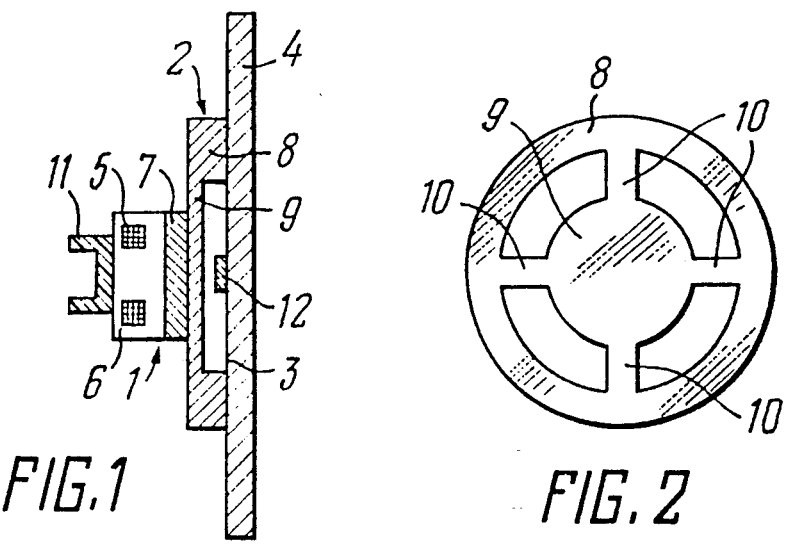
FIG. 1 schematically shows a cross-section view of the device of invention for removing deposits from the surface of a thin-walled structures.
FIG. 2 is a side view of the waveguide of the device illustrated in the FIG. 1.

As is clear from FIGS. 1 and 2, the device of invention for removing deposits comprises a source 1 of single mechanical pulses and a waveguide 2 intended for the transmission of pulses from the source 1 to a section 3 of the surface of a thin-walled part 4 being cleaned and excitation of elastic deformation waves in this part 4. As FIG. 1 vividly shows the source 1 of single pulses is essentially an electric-to-mechanical pulse converter and is formed by an inductor 5 accommodated in a dielectric case 6. A plate 7 of a conducting material is tightly fit on the case 6. The inductor 5 is energized from a conventional source of electric pulses (not shown in FIGS. 1, 2), but whose structure is obvious to anyone skilled in the art, e.g., as shown in FIG. 1 of U.S. Pat. No. 3,549,964, introduced in the present description by way of reference.

Used in combination with such a source of mechanical pulses is the waveguide 2 from poorly conducting or non-conducting material, e.g., steel.

As clearly shown in FIGS. 1 and 2, the waveguide 2 is a ring 8 encompassing the section 3 being cleaned. Arranged in the end surface of the ring 8 opposite to that which is adjacent to the surface being cleaned is a disk 9 from a nonconducting material, which is connected to the ring 8 by virtue of radial jumpers 10. The ring 8, disk 9 and jumpers 10 are made as one whole to provide best conditions for transmitting mechanical forces by the waveguide. The jumpers 10 are disposed radially and perpendicularly to one another. Similar construction of the waveguide can be accomplished by way of machine-turning a steel cylindrical blank.

The source 1 is mounted on the disk 6 by its plate 7 and is fixed in a bracket 11.

Let us consider the principle of operation of the device described, so that the essence of the method of invention will become clear.

As a feeding pulse enters the inductor 5, a force pulse is generated in the plate 7 to be transmitted to the disk 9 of the waveguide 2 and via radial jumpers 10 to the waveguide ring 8. Acting on the thin-walled part 4, these single pulse causes the emergence of elastic deformations therein which partially propagate outwards and partially—inwards the ring 8. Thus, elastic deformations propagate inside the ring 8 in the form of oncoming converging coherent waves and as these converging coherent waves of elastic deformation interact, their intensities are distributed in keeping with a diagram shown in FIG. 3.

Figure 3:
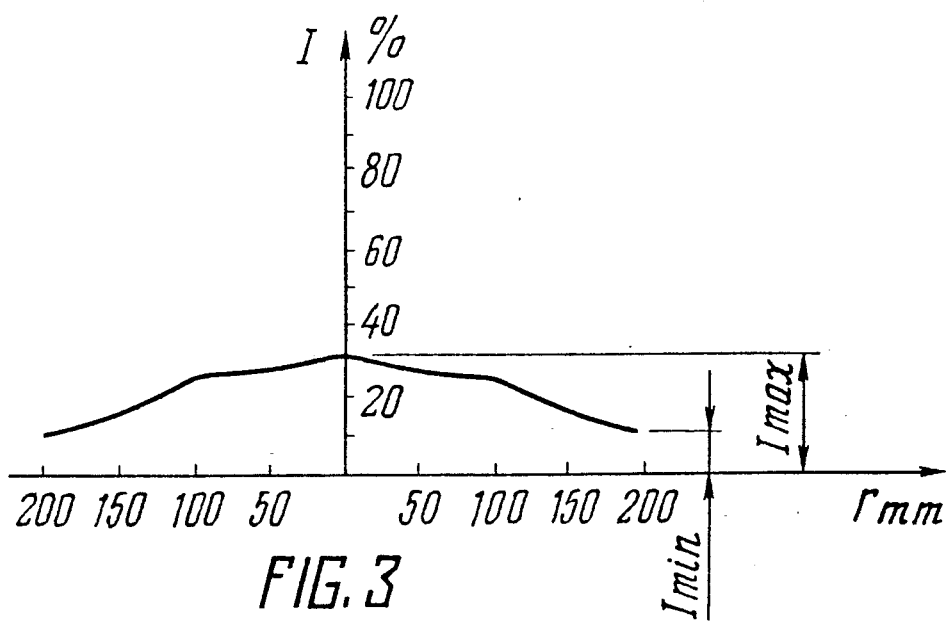
FIG. 3 is a diagram of distribution of the intensity of elastic deformation depending on the distance from the center of the section of surface being cleaned, where I is the intensity of elastic deformation in percentage.
Figure 4:
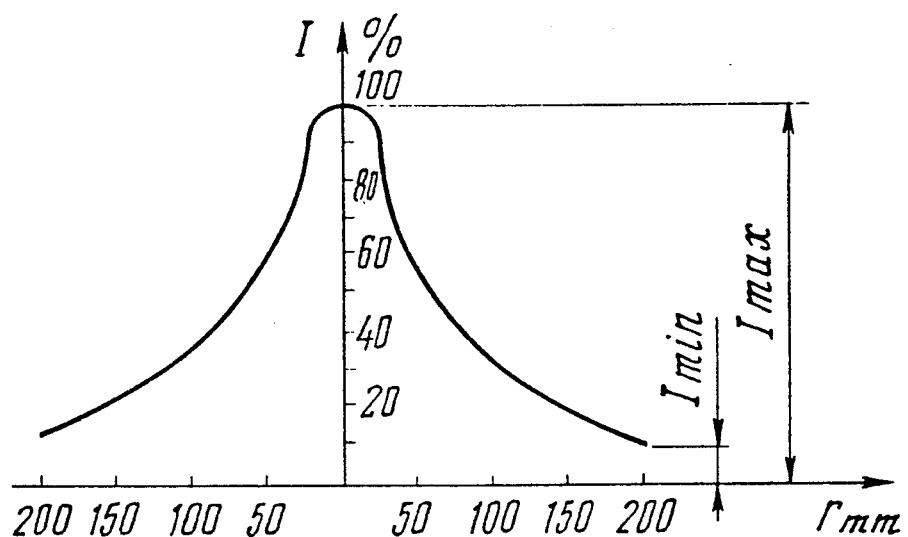
FIG. 4 is the same diagram for a prior art device, where I is intensity of elastic deformation in percentage.

As illustrated in FIG. 3, the intensity (I) of elastic deformation is distributed uniformly across the entire area of the section being cleaned and a mere three-fold decline of intensity occurs at the edge. At the same time, when using diverging waves there occurs a tenfold drop of intensity along the edge of the section as shown in FIG. 4. This means that a peak value of power consumed according to the method of the invention can be decreased roughly three times compared to the prior art.

Still better distribution of intensity in the center of the section being cleaned is attained by installing an additional source 12 of mechanical pulses, conventionally shown in FIG. 1. This source of mechanical pulses can be made as a means for generating electromagnetic field pulses interacting with the thin-walled part and creating elastic deformation waves in the manner analogous to that described in U.S. Pat. No. 3,549,964. It is only necessary that the source 12 of pulses be chosen so that the elastic deformation waves excited by it are coherent to those created by the source 1.

It is clear from the consideration of the above-described device for removing deposits from the surfaces of thin-walled parts that the method of invention is characterized by synchronous excitation of equal single pulses in the opposite points along the contour, in the given example along the circumference encompassing the section being cleaned. In so doing, the emerging elastic deformations represent converging coherent waves to ensure uniform distribution of forces across the entire surface of the section being cleaned.

Earlier there was considered an embodiment variant of the device with a waveguide from a nonconducting material and a variant of the pulse source corresponding to this case. Given the waveguide is made from a conducting material, the source of mechanical pulses differs from that described hereinabove in locking the plate 7 and the waveguide disk functions as the latter.

Figure 5:
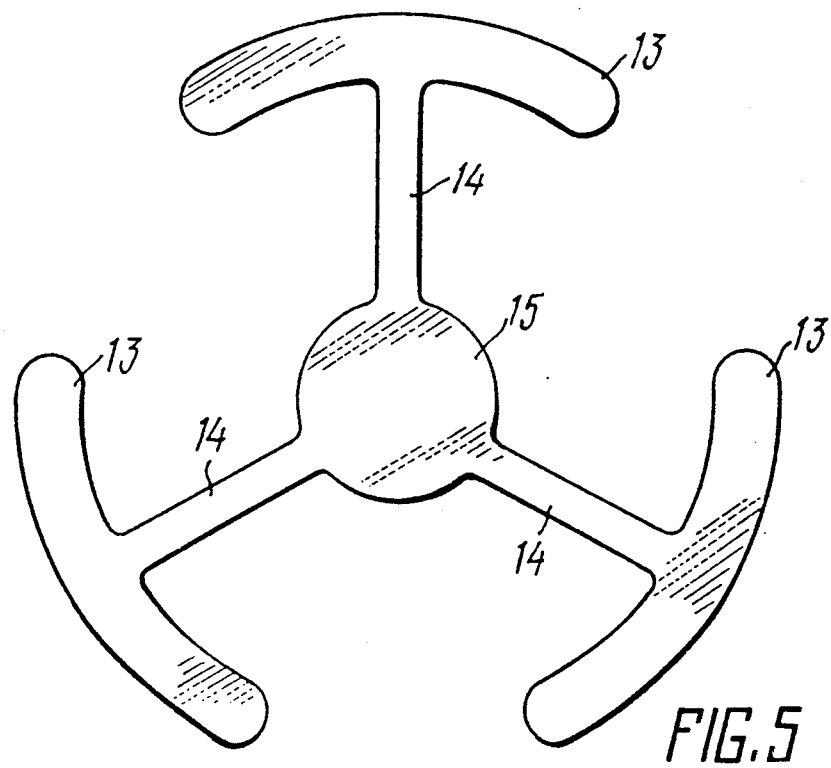
FIG. 5 is another variant of the waveguide structure.

There may be various structural embodiments of the device for removing deposits from the surface of thin-walled structures. In FIG. 5, for one, there is a schematic view of a waveguide formed by three sectors 13 connected by jumpers 14 with the disk 15 which is intended for accommodating a source of mechanical pulses, e.g., analogous to that illustrated in FIG. 1. The sectors 15 are arranged in circumference and when installed in a section of the thin-walled part being cleaned, generate elastic deformations in this part which are on-coming coherent waves.

Figure 6:
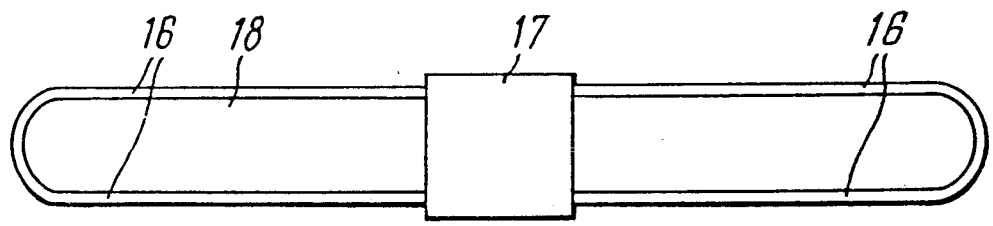
FIG. 6 is a variant of the waveguide structure with parallel arms.
Figure 7:
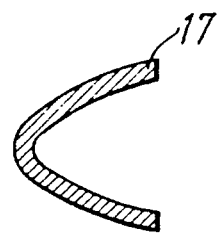
FIG. 7 is a cross section taken along VII—VII as in FIG. 6.

Schematically shown in FIG. 6 is a waveguide with parallel arms 16 connected to the plate 17 having the shape in cross-section as shown in FIG. 7 which corresponds to the configuration of the part being cleaned, e.g., the profile of an aircraft wing. These arms 16 limit space 18 cleaned with the aid of the device of invention. In so doing, the converging coherent waves of elastic oscillations are developed between parallel waveguides.

Figure 8:
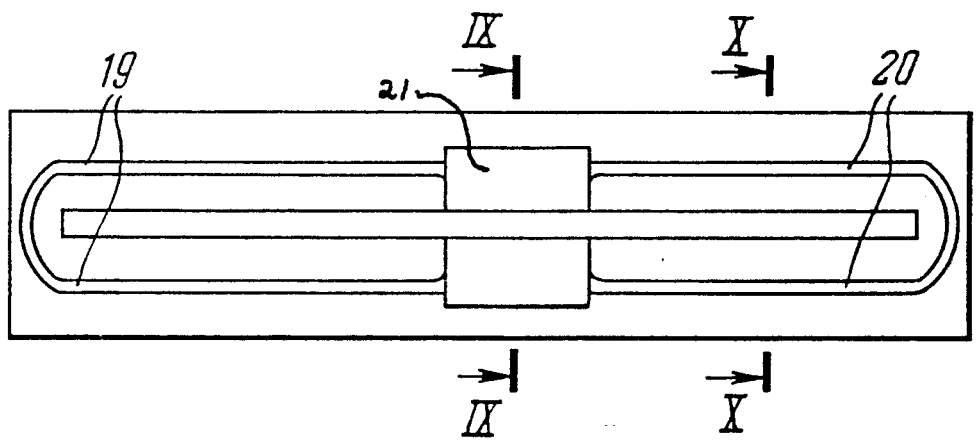
FIG. 8 is the device of invention installed on the skin to be cleaned.
Figure 9:
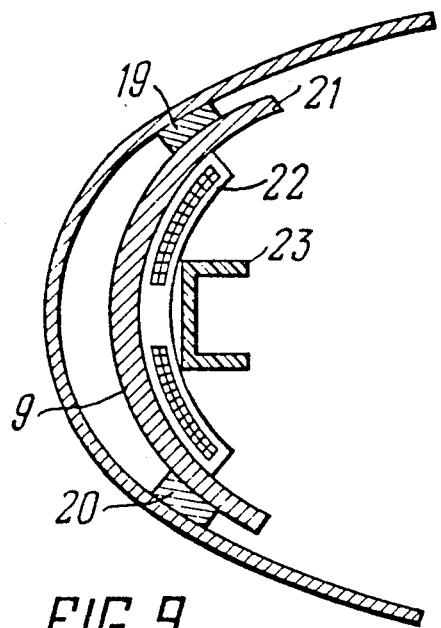
FIG. 9 is a cross section taken along IX—IX as in FIG. 8 (enlarged view)
Figure 10:
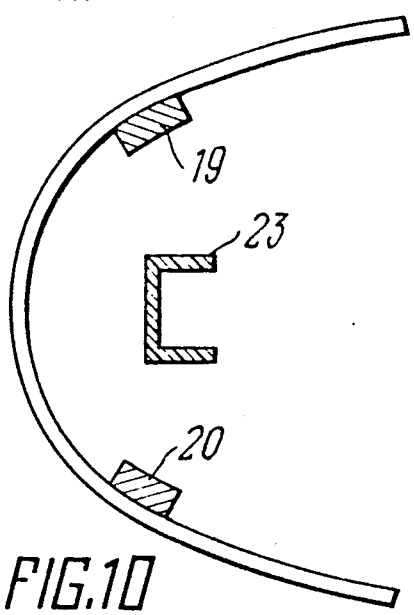
FIG. 10 is a cross section taken along X—X as in FIG. 8 (enlarged view)

Schematically illustrated in FIGS. 8 through 10 is another embodiment variant of the device for removing deposits, comprising a waveguide with two pairs of parallel arms 19 and 20 (FIGS. 8 and 9), connected to the plate 21 (FIG. 9) of a parabolic section, carrying the inductor 22 of parabolic shape installed in the bracket 23.

Figure 11:
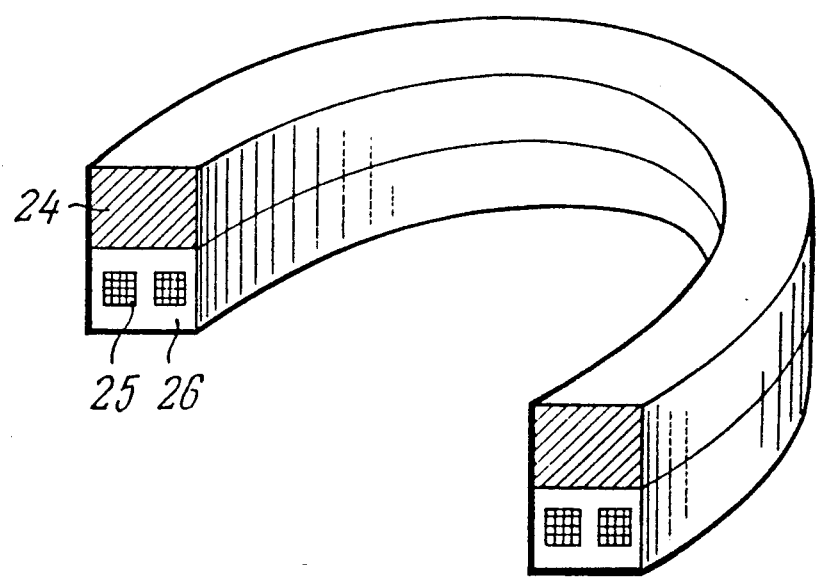
FIG. 11 is still another variant of the device of invention.

In the final analysis, the device of invention can be made as shown in FIG. 11 in the form of an elliptic ring 24 designed to be installed in the section of a thin-walled structure being cleaned and furnished with an elliptic inductor 25 of the same elliptic configuration as the ring accommodated in the case 26. Only one half of the ring is shown, the opposite portion being symmetrical therewith.

Industrial Applicability

The device of invention for removing deposits from the surface of thin-walled structures can be used for deicing the skin of aircraft wings, the skin of ships, the walls of railway cars and other transportation means.

What is claimed is:

1. A method for removing deposits from surfaces of walls of thin-walled structures, comprising the step of causing elastic deformations in said walls by exciting consecutive individual mechanical pulses, said step of causing including the step of synchronously exciting identical individual pulses at opposed points along a contour encircling a portion of a surface from which deposits have to be removed, wherein converging coherent waves of elastic deformation directed inwardly from said contour interact with one another.

2. The method of claim 1, wherein said individual pulses are excited at points along a closed contour, and auxiliary pulses identical with said individual pulses are excited synchronously with said individual pulses at a center of an area defined by this closed contour, wherein diverging waves of elastic deformation interact with said converging coherent waves coherent therewith.

3. An apparatus for removing deposits from the surface of thin-walled structures, comprising an electromagnetic source of mechanical pulses to be transmitted to walls of said thin-walled structure for producing elastic deformations therein, a waveguide of mechanical forces generated by the source, the waveguide having opposed parts positioned symmetrically with each other, defining an area of said surface from which deposits have to be removed and connected to said source for synchronously exciting individual pulses in the opposed parts, wherein converging coherent waves of elastic deformation are formed in said wall from which deposits have to be removed.

4. The apparatus of claim 3, wherein the waveguide comprises a ring having a disk at its center, the disk being coupled to an electromagnetic source and connected to the ring by means of symmetrical pillars.

5. The apparatus of claim 3, wherein the waveguide comprises a pair of parallel branches, one end of each branch being coupled to a plate coupled to the source of mechanical pulses, and other ends of the branches being connected to each other.

6. The apparatus of claim 3, wherein the waveguide comprises two pairs of parallel branches extending in opposite directions from a plate coupled to a source of mechanical pulses, the parallel branches of each pair having ends thereof connected together.

7. The apparatus of claim 3, wherein the waveguide comprises three sectors equally spaced along an imaginary circle which are connected by means of pillars to a centrally positioned disk and coupled to the source of mechanical pulses.

8. The apparatus of claim 3, wherein an auxiliary source of mechanical pulses identical to said pulses from the first-mentioned source is provided at a center of a ring on a side thereof which is installed on the surface from which deposits have to be removed.

9. The apparatus of claim 4 or 5 or 6 or 7, wherein a plate of the waveguide is made of an electrically non-conducting material, and the electromagnetic source of mechanical pulses is formed by an inductor connected to an electric discharge power supply and directly to the plate.

10. The apparatus of claim 4 or 5 or 6 or 7, wherein a plate of the waveguide is made of an electrically conducting material, and the electromagnetic source of mechanical pulses is formed by an inductor connected to an electric discharge power supply and directly to the plate.

11. The apparatus of claim 3, wherein the waveguide comprises an elliptical ring made of an electrically conducting material and the source of mechanical pulses is formed by said ring and by an elliptical inductor mounted directly on said ring and connected to an electric discharge power supply.

* * * * *